United States Patent Office 3,554,906
Patented Jan. 12, 1971

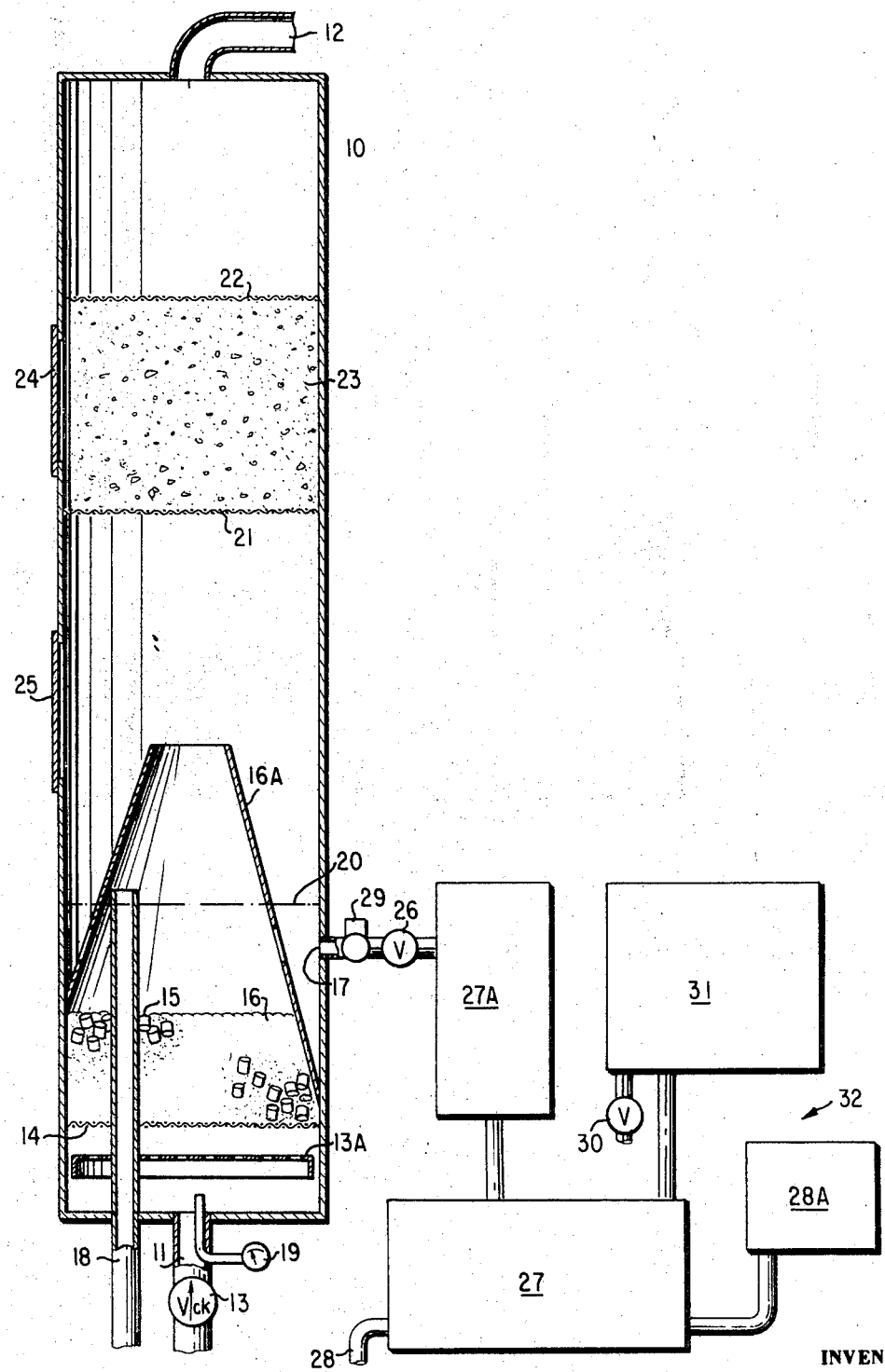

3,554,906
EXTRACTING OIL WASTE
Neil H. Wolf, Metairie, La.
(P.O. Box 513, Westwego, La. 70094)
Continuation-in-part of application Ser. No. 709,293, Feb. 29, 1968. This application Mar. 10, 1970, Ser. No. 18,238
Int. Cl. B01d 12/00, 15/00
U.S. Cl. 210—23
6 Claims

ABSTRACT OF THE DISCLOSURE

An apparatus for removing oil particles from water comprising an absorption tower containing a diffusing medium, a solvent having a higher specific gravity than water and being insoluble in water, and a porous material which is permeable to water and impermeable to oil and solvent. A method for removing oil particles from water comprising the steps of passing water containing oil particles through a particulate diffusing medium containing particles such as sand, gravel or Raschig rings, and high specific gravity solvent, the oil particles adhering to the solvent by a process of absorption, and the oil-free water discharging through a water-permeable porous mass. Electrically operated sensing means is located near the discharge of the oil-free water to verify that adequate separation is achieved and to guarantee efficient recovery of the solvent.

---

This is a continuation-in-part application of copending U.S. patent application Ser. No. 709,293, filed Feb. 29, 1968, now abandoned.

This invention relates to a method and apparatus for removing oil particles from water and, more particularly, to a method and apparatus for removing oil particles from water by utilizing an absorption column containing a high specific gravity solvent which is insoluble in water.

In the production of oil, it is quite common to produce water in varying amounts, which water must be removed from the crude oil, and which becomes known as waste or discharged water. This water is produced at the well and is generally separated from the crude oil at that point or nearby at a collection center, the separation of the oil from the water usually being accomplished by use of physical apparatus and chemical components used to accelerate the separation. Since the amount of water produced with the crude oil varies from place to place, its disposal very often becomes a prime concern, particularly inasmuch as the apparatus used to separate the water from the oil leaves a certain amount of minute oil particles in the water; and, when the water is disposed of or discharged, these particles of oil create a pollution problem, particularly in offshore oil production areas. Conservation laws and requirements, both State and Federal, have made it necessary for oil producers to take extreme steps to prevent this pollution, and demands are constantly being made upon them to provide a method of removing all, or nearly all, of these particles from the discharged water.

In the operation of a refinery, a petroleum crude oil is processed to form many products. In the course of such operations, large quantities of water are used for many purposes. When used as a purifying medium, the water becomes contaminated with the contaminants removed from the petroleum, and particularly with particles of oil. Formerly, the water used in the refinery for either purification or processing purposes, when contaminated, was disposed of by discharging it into a stream or some other available body of water.

With the increase in the number and size of refineries and the number of processing steps utilizing water in the refining operation, the amount of contaminants has reached such proportions as to pollute streams, lakes or other bodies of water. The water pollution has reached the extent that the fish, marine life and animals in the vicinity suffer and the obnoxious odors of refinery waste materials are a nuisance to the surrounding population.

At present, the matter of disposing of refinery waste water is a major problem from the standpoint of conservation. In order to prevent the pollution of water, laws and regulations have been passed by the Federal and State governments regulating the discharging of water containing contaminants. These laws and regulations pertain to both salt and fresh water, and compliance has proven to be an expensive problem for oil refiners.

In many areas, processing water is not available in sufficient quantity to permit its disposal after use. In such cases, it is essential to reuse the water rather than to dispose of it and continuously use fresh water. Additionally, in view of the vast quantities of water utilized in the refining processes, large quantities of oil are inadvertently discarded along with the water.

In order to eliminate the aforementioned problems, applicant has invented a new and improved method and apparatus for removing oil particles from waste water in an economical manner wherein the oil normally lost can be salvaged and the waste water purified in accordance with the law and with good conservation practices.

An object of this invention is to provide an apparatus for separating oil particles from water.

Another object is to provide a method of separating oil particles from water.

Another object is to provide an improved apparatus for removing oil particles from water wherein the separation medium is reusable.

Another object is to provide a method of removing oil particles from water by an absorption process.

Another object is to provide an improved apparatus for removing oil particles from water efficiently and economically by a process of absorption.

Another object is to provide a method of removing oil particles from water utilizing a solvent having a higher specific gravity than water.

Another object is to provide a method of recovering the oil particles from the discharged water, inasmuch as in large oil producing operations, the amount of oil particles discharged with the waste water is substantial.

Additional objects and advantages of the invention will be set forth in part in the description which follows and, in part, will be obvious from this description, or may be learned by the practice of the invention as described in the specification, attached drawing and claims.

The invention consists of the novel parts, constructions, arrangements, combination and improvements as shown and described. A preferred embodiment of this invention of an apparatus for removing oil particles from water will now be described with particular reference to the accompanying drawing which is incorporated in and constitutes a part of the specification and wherein there is shown a cut-away side view of an apparatus for separating oil particles from water with a diagrammatic view of the regenerative system.

In the drawing, there is shown an absorption column 10. The absorption operation carried out in absorption column 10 is the process wherein oil molecules or particles of the oily substance are taken up by the solvent material. The absorption column 10 has a water inlet 11 at the bottom thereof and a water outlet 12 at the top thereof. A check valve 13 is mounted within the inlet 11 in a manner to allow water to enter the absorption column 10 through the inlet 11 while preventing its discharge therethrough. The check valve 13 may be any commercially available valve which can be adapted to permit one-way flow and is operable either manually or automatically.

Disposed with the absorption column 10 and at the bottom thereof, is apertured spreader plate 13A which is above the inlet 11 and adjacent to and below the fine screen 14. Water which flows into absorption column 10 through the inlet 11 passes through and around the spreader plate 13A and through the fine screen 14. The screen 14 has a sieve size sufficient to permit the water and any dissolved and entrained impurities contained therein to enter the absorption column 10 while supporting the packing medium 16 and preventing the packing medium, consisting of particles of solid material such as sand and gravel, from falling out of the absorption column.

Secured within the lower portion of the absorption tower 10 and above the supporting fine screen 14 is an inverted funnel 16A which serves as a containing means for Raschig rings 15. A Raschig ring is a hollow cylinder having a length about equal to its diameter, and is commonly used as a packing or filtering material within chemical towers. While a Raschig ring 15 is used in the preferred embodiment, it will be obvious to those skilled in the art that the ring 15 is used only for the purpose of expediency, and that any other type of packing material can be used. An example of an alternate type of containing or packing means is a plurality of wire screens. The packing medium shown in the drawing has disposed therein the Raschig rings, but this packing medium can include any type of coarse particulate material, such as sand, gravel, burlap, terry cloth, coke or excelsior. Obviously, any combination of the above or other particulate materials can be utilized. For the purposes of the present invention, it is preferred to utilize the packing medium 16 consisting of a mixture of sand and gravel packed with the Raschig rings 15.

Extending outwardly from the side of the absorption tower 10 at a point above the packing 16 and below the organic solvent liquid level 20 is organic solvent waste outlet 17 which feeds waste solvent to the regeneration system shown at the lower right side of the drawing; and extending slightly above the liquid level 20 of organic solvent in the absorption tower 10 and placed above the solvent waste outlet 17 is a solvent inlet 18 which passes through the spreader plate 13A, screen 14 and packing 16, as shown in the drawing. The discharge end of the solvent inlet 18 is positioned above the packing medium 16 and raises the level of the organic solvent having a specific gravity higher than that of water to the level 20, as illustrated by the broken line extending all the way across the tower 10; and the distance between the outlet 17 and the inlet 18 can be varied depending upon the amount of water desired to be treated within a specific period of time. In order to check the specific gravity of the organic solvent at the base of the absorption tower 10, there is provided a specific gravity meter 19 and a sampling extension from the specific gravity meter 19 extends through water inlet pipe 11 into tower 10 to a level below the spreader plate 13A. As shown in the drawing, the sample is taken at the very bottom of the tower 10 and far below the outlet 17 and below the inlet 18.

A solvent 20 which is insoluble in water and has a higher specific gravity than water is disposed within the absorption column 10 through the solvent inlet 18 until the solvent 20 is approximately level with the inlet 18. Since water at 39.2° F. has a specific gravity of 1.00 and water at 212° F. has a specific gravity of .958, any solvent which is insoluble in water and has a specific gravity greater than 1.00 can be used successfully in this invention. In the preferred embodiment, three different solvents have been tested and found to be highly efficient. The preferred solvents contemplated in the present invention are acetylene tetrabromide, acetylene tetrachloride, perchloroethylene and mixtures of these with xylene, which mixtures have a density greater than the density of water. Thus, all of the preferred solvents are insoluble in water and have a specific gravity greater than water.

Secured within the absorption tower 10 at a point above the solvent inlet 18 is a wire screen 21. The wire screen 21 is of sufficient area to contact the entire inner periphery of the tower 10. Another wire screen 22 is mounted within the absorption tower 10 in spaced, parallel relationship to the screen 21. The spacing between the funnel end 16A and the screen 21 is varied to adjust to the capacity of the unit. The screen 22 is located above the screen 21 and below the water outlet 12. Disposed between the wire screens 21 and 22 and adapted to be supported thereby is a semiporous mass 23, such as pumice or perlite. Both pumice and perlite are porous or spongy forms of volcanic glass which have the unique property, when thoroughly wet with water, of permitting water to pass through while restraining oil and solvents, such as acetylene tetrabromide, acetylene tetrachloride, etc. While a mass of pumice 23 is the preferred semiporous material, it will be obvious to those skilled in the art that any semiporous mass may be used which, when thoroughly wet with water, will permit water to pass therethrough while restraining oil and solvents.

A portion of the wall of the absorption tower 10 adjacent the semiporous mass of pumice 23 is cut out and a door 24 is hingedly secured to the tower to seal the opening formed by the cut out, when desired. Then the semiporous mass of pumice 23 becomes clogged with impurities to the extent that water will be unable to pass therethrough, the door 24 is opened and the semiporous mass 23 can be cleaned or replaced.

In operation, waste water containing particles of oil is pumped into the absorption tower 10 through the inlet 11 and enters past spreader plate 13A. The entering water passes through the fine screen 14 and enters the packing medium 16, retained by the inverted funnel containing means 16A, and passes through the packing consisting of sand, gravel and Raschig rings 15. The check valve 13 prevents the water from back-flowing through the inlet 11. As the water containing oil particles passes through the sand and gravel packing medium 16 and through the Raschig rings, the particles of oil adhere to, are broken up and are better diffused by the fine particles of the medium 16 for greater surface contact with the solvent. Depending upon the time of contact of the waste water with the packing medium 16, a percentage of the oil particles will adhere to the packing medium 16 and the remainder will remain in suspension in the water and will pass into the high specific gravity organic solvent 20 in the location as shown in the drawing. A greater proportion of oil particles is absorbed by the organic solvent.

It is contemplated that a continuous specific gravity sensing and monitoring means will be employed in order to provide a semiautomatic or automatic operation in the control of absorption and solid recovery, especially with respect to the control of the proportioning of solvent to waste water. These automatic devices are shown and are widely used under conditions where labor costs are high and the hazards in off-shore oil operations are great. One typical example of a device responsive to changes in the density of liquids is shown in G. M. Croft U.S. Pat. No. 2,320,720. An example of a device which is useful for proportioning liquids is found in S. J. Cohen U.S. Pat. No. 2,543,522. It is contemplated that these and other known devices can be advantageously used with the present oil waste extracting apparatus for remote operations, whether constructed as permanent platforms from which developmental wells are drilled or whether part of a boat, barge or portable helicopter-lifted floating unit. In brief, the oil recovery unit can be scaled in size and capacity, and a number of units in series may be employed to handle emergency leakage.

To thoroughly disperse the waste water through the packing medium 16, a spreader plate 13A is mounted within the absorption tower 10 adjacent the waste water inlet 11. The spreader 13A can consist of a hollow disc having a plurality of openings in the side adjacent the packing medium 16. After the waste water enters spreader 13A, it will pass therefrom through the openings dispersed along the entire surface area adjacent packing medium 16. The spreader plate 13A causes the water passing therethrough to take an irregular path through the packing medium 16, thereby increasing the contacting surface area of the oil-absorbing solvent with the waste water.

Dispersed throughout the sand and gravel packing medium 16 and above it, up to the solvent inlet 18, is the heavy specific gravity organic solvent 20. As the waste water and oil particles pass through the packing medium 16, the heavy specific gravity organic solvent absorbs the oil particles and the oil particles go into solution in the solvent with the water phase above the broken line. The solvent 20 also tends to cleanse the packing medium 16 of the oil particles adhering thereto, thereby regenerating the packing medium. In view of the tortuous dispersed path of the waste water through the packing medium 16, the waste water tends to take a similar path through the solvent 20.

As the volume of the waste water entering through the water inlet 11 causes the water level in the absorption tower 10 to rise, most of the oil particles in the waste water are absorbed by the packing medium 16 and the solvent 20 and the remaining oil particles are restrained by the pumice mass 23 as the water passes therethrough. Since the water has a lower specific gravity than the solvent 20, the water, after passing through the packing medium 16, enters the solvent area and rises through the solvent 20 to enter the pumice mass 23. Because of the absorption qualities of the solvent 20, the oil, which has a higher specific gravity than the water, will dissolve in the solvent and will tend to remain below the level of the rising water. After the water passes through the solvent 20 and the semiporous pumice mass 23, it is substantially free of oil particles and is allowed to pass out from the absorption tower 10 through the water outlet 12. The clear, oil-free water discharged from the water outlet 12 can be recirculated for use in the refinery's processing operations or can be dumped into any nearby body of water without being in contravention with existing State and Federal laws and regulations.

Access to the upper part of the tower 10, for cleaning and recharging, is had through plate 24; and, similarly, access 25, located below screen 21, is an opening provided for checking the packing and dispersing media.

In essence, we have a column wherein the oil production discharge water, containing oil particles, is run through the column from the bottom to the top. It is first subjected to a spreader plate, designated as 13A in the drawing, for the purpose merely of forcing the discharge water to begin its journey through the column in more even distribution rather than in channels. The discharge water then goes through a screen 14, shown in the drawing, the purpose being to hold the sand and Raschig rings away from the inlet to the column. In its journey through the sand, gravel and Raschig rings, the discharge water is further diffused and spread for the purpose of allowing it to be exposed to the greatest surface area of the solvent that is contained within the column.

As the waste water is treated by the solvent 20 in the absorption tower 10, the specific gravity of the solvent is lowered because of the absorption of the oil particles therein. Since the specific gravity of the oil particles is lower than that of the water, the oil particles would normally tend to rise to the top of the water and consequently seal the pores of the semiporous pumice mass 23. The oil particles are prevented from rising to the top of the water by their absorption in the heavier specific gravity solvent 20. The absorption of the oil particles by the solvent 20 tends to lower the specific gravity of the solvent to a point lower than that of the water. When the specific gravity of the solvent 20 becomes lower than that of water due to the absorption of the oil particles, the solvent 20 and the absorbed oil particles rise to the top of the water and plug up the pores in the semiporous mass 23. Additionally, when the specific gravity of the solvent 20 becomes lower than that of water, the solvent rises and remains above the incoming waste water, preventing the oil particles in the incoming waste water from passing through the solvent and the consequent absorption thereof.

In order to prevent the aforesaid problems which are incurred when the specific gravity of the solvent 20 decreases to a point lower than water, a regenerative system 32 for restoring the solvent 20 to its original specific gravity is provided. This regeneration may be accomplished on a continuous basis, that is, constantly taking some of the oil-saturated solvent out of the tower and replacing it with new solvent while a regeneration of the solvent takes place in a separate container, or on a batch basis by draining the oil-solvent solution after shutting down the tower operation and refilling the same with new solvent from a reservoir and then regenerating the solvent from the previously extracted solution. Batch regeneration may be effected on a periodic interval basis, based on time intervals computed from the amount of oil flowing through the unit, or by use of a continuous monitoring and triggering device using a gauge to measure the specific gravity of the solvent which is incorporated therein.

These devices are known, and employ an electrical signal which is generated by the specific gravity meter at a point when the specific gravity of the solvent has risen above or fallen below the maximum and minimum values which are set for proportioned, continuous flow. This electrical signal, in the case of batch operation, may actuate a valve 26, which would dump the solvent in the tower into the regeneration container, and new solvent from a reservoir would replace the same.

Near outlet 17, there is a valve 26 which allows the solvent 20 and the oil particles in solution to flow from the absorption tower 10 into a distillation tank 27 which is secured to the waste outlet 17. Prior to the solvent reaching the distillation tank 27, it will go into separate tank 27A which will allow the water to separate from the solvent. Located in the distillation tank 27 is an oil and water bleed-off 28, which will allow the oil residue after distillation of the solvent 20 to be bled from the distillation tank 27 as the solvent 20 is distilled by use of steam 28A, and regenerated.

The regeneration, whether continuous or by batch process, may depend upon sensing of the specific gravity of the solvent 20 as it approaches that of water and the sensing meter 19 which measures the specific gravity of the solvent generates an electrical signal characteristic of the gravity condition. The electrical signal from the meter 19 actuates a valve 26, located in the solvent waste outlet 17. The signal generated by the meter 19 when the specific gravity of the solvent 20 approaches that of water causes the valve 26 to open. The opening of the valve 26 allows the solvent 20 and the entrapped oil particles to flow from the absorption tower 10 into a distillation tank 27 which is secured to the waste outlet 17. Located in the distillation tank 27 is an oil bleed-off 28 which will allow the oil particles adhering to the solvent 20 to be bled from the distillation tank 27 as the solvent 20 is distilled and regenerated.

The distillation of the solvent 20 in order to remove the oil particles and restore its specific gravity can be accomplished in any well-known manner. The distillation should continue until approximately all of the oil particles are bled off and the solvent substantially returns to its original specific gravity.

In order to prevent the waste water from flowing into the absorption tower 10 when the solvent 20 is being discharged into the distillation tank 27, the valve 13 is closed during the purging operation in any well-known manner, either manually or automatically. A volumetric means 29 is positioned in the waste outlet 17 and is adapted to close the valve 26. When solvent in the absorption tower has been purged therefrom and the volumetric means 29 deactivates the valve 26, causing it to close, an additional valve 30, disposed within the solvent inlet 18, is actuated to open to the inlet and to the reserve tank 31 and inlet 18 is connected to a solvent reserve tank 31 and when the valve 30 is opened the fresh solvent in the reserve tank 31 is allowed to flow into the absorption tower 10. When the solvent 20 from the reserve tank 31 fills the lower portion of the absorption tower 10 up to the height of the solvent inlet 18, the check valve 13 is reopened to allow the waste water to enter the absorption tower 10 and cause a recycle of the oil absorption process.

The preferred embodiment of the regenerative system 32 includes a transfer means mounted between the distillation tank 27 and the reserve tank 31, wherein the regenerated and restored solvent 20 will pass through the transfer means to the reserve tank 31 when the specific gravity of the solvent is greater than that of water. The solvent will pass through the transfer means on a continuous basis as the solvent is being restored so that the reserve tank 31 and the absorption tower 10 will have a constant supply of restored solvent. In the regenerator embodiment, a percentage of the degenerated or worn-out solvent 20 is continuously discharged from the absorption tower 10 to the distillation tank 27, while an equal amount of restored or regenerated solvent is allowed to enter the absorption tower 10 from the reserve tank 31. This continuous circulation of the solvent allows the maintenance of a constant volume of solvent having a specific gravity greater than water in the absorption tower 10.

An advantage of this invention is that the oil particles carried by the waste water can be quickly and easily removed from the absorption solvent and utilized. Another advantage is that the absorption solvent can be regenerated and reused. Another is that the waste water, after processing, can be either used in the refining process or can be discharged without breaking the law.

For purposes of exemplification, a particular embodiment of the present invention has been shown and described according to the best present understanding thereof. However, it will be obvious that changes and modifications in the arrangement, construction and composition of parts and materials may be resorted to without departing from the spirit and scope of the invention.

I claim:
1. A process of removing oil particles from waste water comprising the steps of:
   passing said waste water through a packing medium consisting of sand and gravel;
   passing said waste water from said packing medium through a solvent which is insoluble in water and has a higher specific gravity than water, said solvent being selected from the group consisting of acetylene tetrabromide, acetylene tetrachloride and xylene;
   passing said waste water from said solvent through a semiporous mass which is permeable to water and impermeable to solvent and oil, whereby said oil particles are separated from said waste water by a process of absorption when passing through said packing medium and said solvent and any remaining oil particles in said waste water are restrained by said semiporous mass so that substantially oil-free water exits from said mass;
   monitoring the specific gravity of said solvent; and
   regenerating said solvent to remove adhering oil particles therefrom when the specific gravity of said solvent approaches that of water.
2. An absorption tower for removing oil particles from waste water comprising:
   a particulate solid material packing medium disposed within the lower portion of said tower;
   a solvent which is insoluble in water and has a higher specific gravity than water dispersed about and above said packing medium within said tower;
   a semiporous mass disposed within said tower above said solvent, said semiporous mass being permeable to water and impermeable to oil and solvent;
   a waste water inlet disposed in the bottom of said tower adjacent said packing medium;
   a water outlet disposed along the top of said tower above said semiporous mass whereby waste water entering said tower through said inlet passes upwardly through said packing medium and said solvent, whereby said oil particles are separated from said waste water by their absorption in said packing medium and said solvent and substantially oil-free water passes through said semiporous mass and exits from said tower through said outlet;
   means for monitoring the specific gravity of said solvent; and
   means for regenerating said solvent to remove oil particles therefrom when the specific gravity of said solvent approaches that of water.
3. An absorption tower in accordance with claim 2, wherein said semiporous mass is perlite.
4. A process in accordance with claim 1, wherein said semiporous mass is pumice.
5. A process in accordance with claim 1, wherein said semiporous mass is perlite.
6. A process in accordance with claim 1, wherein said packing medium includes Raschig rings.

References Cited
UNITED STATES PATENTS

| | | | |
|---|---|---|---|
| 691,835 | 1/1902 | Wyman | 210—296 |
| 1,866,187 | 7/1932 | Boon | 210—296X |
| 1,923,534 | 8/1933 | Fry | 210—296X |
| 2,785,123 | 3/1957 | Stroud | 210—23 |

SAMIH N. ZAHARNA, Primary Examiner

U.S. Cl. X.R.

210—25, 96, 284, 296